Figure 1:
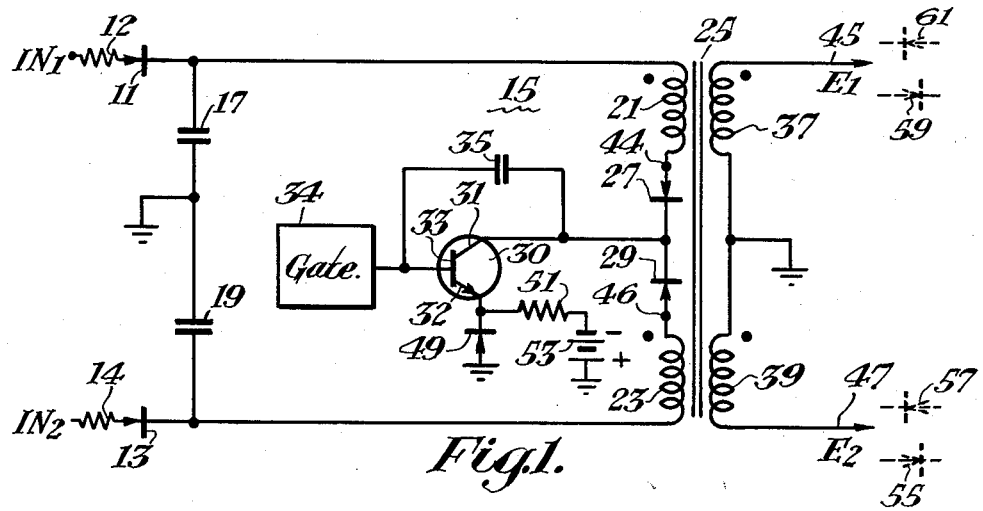

July 4, 1961  T. J. BLOCHER, JR  2,991,372
VOLTAGE SIGNAL COMPARISON MEANS WITH STORAGE MEANS
Filed Feb. 8, 1960

INVENTOR.
Thomas J. Blocher Jr.
BY W. L. Stout
HIS ATTORNEY

United States Patent Office 2,991,372
Patented July 4, 1961

2,991,372
VOLTAGE SIGNAL COMPARISON MEANS WITH STORAGE MEANS
Thomas J. Blocher, Jr., Monroeville, Pa., assignor to Westinghouse Air Brake Company, Wilmerding, Pa., a corporation of Pennsylvania
Filed Feb. 8, 1960, Ser. No. 7,174
9 Claims. (Cl. 307—88.5)

The present invention relates to a differential amplifier for comparing the amplitudes of two input signals or voltages, and more particularly to an improved differential amplifier in which the signals being compared need not attain their peak amplitude concurrently.

The copending application for Letters Patent of the United States Serial No. 829,272 of Paul N. Bossart and Thomas J. Blocher, Jr., filed July 24, 1959, entitled Radiant Energy Detector and assigned to the same assignee as in the present invention, disclosed a system for detecting and indicating overheated wheel bearings on railroad cars. As described in the foregoing application, two separate detector units including the two respective heat sensitive cells are mounted alongside of a railway track for simultaneously monitoring the wheel bearings on opposite sides of the same axle. In the foregoing detector it is desired to compare the output from one detector cell with the output of the other heat sensitive cell.

Accordingly, it is a principal object of my invention to provide an improved differential amplifier for comparing two input voltages.

Due to various reasons the two voltages being compared may not reach their maximum amplitude simultaneously.

It is therefore another object of my invention to provide an improved differential amplifier for comparing two voltages which may not attain a maximum amplitude concurrently.

The average temperature of an area appears to provide a better indication of the temperature of the target than does an output of the cell viewing an isolated point. Integration of the output of the cells also tends to prevent noise spikes from incorrectly triggering the utilization.

It is, therefore, another object of my invention to provide a differential amplifier which integrates the input signals.

It is another object of my invention to provide a differential amplifier which does not load the input signals and thus tends to maintain an accurate reference level.

In the attainment of the foregoing objects I provide a transformer having a pair of primary windings wound in polarity opposition and at least one secondary winding, means for connecting the input voltages or signals to respective capacitors and means for selectively providing a discharge path for each of said capacitors through a respective one of said primary windings. The capacitor having the higher amplitude voltage stored therein causes an increasingly larger current to flow in the respective primary winding until the voltage developed across said two primary windings are equal, whereby the circuit tends to balance and the two capacitors then discharge through their respective primary windings and the voltage developed across said secondary winding is proportional to the difference in amplitudes of the two input voltages.

Figure 2:
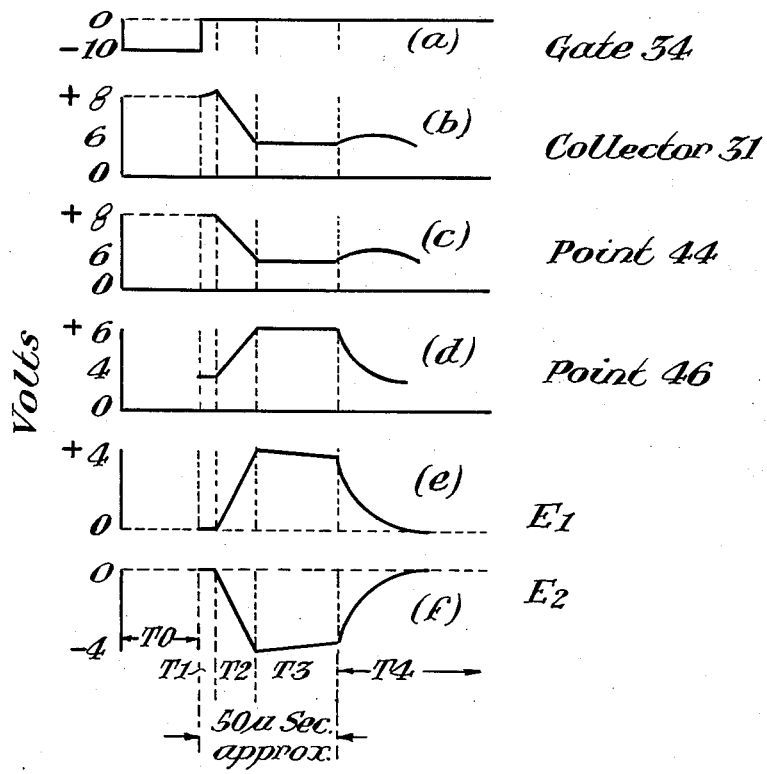

Other objects and advantages of my invention will become apparent from the following description taken in connection with the accompanying drawings in which like reference characters refer to like elements throughout and in which:

FIG. 1 is a schematic diagram of the differential amplifier in accordance with my invention; and FIG. 2 shows curves useful in describing the operation of the circuit of FIG. 1.

Referring to FIG. 1, differential amplifier 15 employs a single three-electrode N-P-N type transistor 30, utilized essentially as a switching means, and an iron core transformer 25 having a pair of primary windings 21 and 23 and a pair of secondary windings 37 and 39.

Transistor 30 has an emitter 32, a collector 31 and a base 33. Emitter 32 is connected through a resistor 51 to the negative terminal of a direct current source or battery 53. Emitter 32 is also connected through a diode 49 to ground; the emitter 32 is connected to the cathode of the diode and the anode of the diode is connected to ground.

Diode 49 limits the maximum current flow through transistor 30. For example, assume battery 53 supplies —15 volts to resistor 51 which has a resistance of 1000 ohms and that transistor 30 is initially cut off. The —15 volts supply causes 15 milliamperes to flow from ground reference through diode 49 and resistor 51 to the negative terminal of battery 53. Assume next that transistor 30 starts conducting. The total current flow through resistor 51 remains the same; however, the current flowing from the collector to emitter of transistor 30 combines with the current flowing through diode 49. Therefore, the current through the diode 49 decreases. The maximum condition is reached when no current flows through diode 49 and a maximum current of 15 milliamperes is flowing from the collector to emitter of transistor 30. Once the maximum condition is reached and if transistor 30 tends to draw more current, the current flowing through resistor 51 tends to make emitter 32 more positive and tends to reverse bias transistor 30 and thus tends to reduce the current flowing through the transistor; all of which results in limiting the maximum collector current that may flow.

Base 33 of transistor 30 is connected to a biasing or gating source 34, of any suitable type. Source 34 provides a positive voltage for maintaining transistor 30 normally conducting, and cut off transistor 30, that is, provides a negative voltage to cause transistor 30 to be nonconducting in response to signals from a wheel inductor of the type described in the aforementioned application Serial No. 829,272. When transistor 30 is rendered nonconducting the capacitors 17 and 19 are permitted to charge.

Collector 31 is connected to the junction of two diodes 27 and 29 which are connected in polarity opposition, that is, their cathodes are connected to one another for purposes to be described hereinbelow.

A capacitor 35 connected from collector 31 to base 33 prevents overshoot of the output signal. Assume transistor 30 is cut off and capacitor 35 is negative due to a negative bias on base 33. When a positive gating voltage is provided by source 34 to base 33, capacitor 35 must discharge slightly before transistor 30 can start conducting. This provides a means causing transistor 30 to turn on, that is, start conducting more gradually, and tends to dampen the initial surge of current through the primary windings 21 and 23 to prevent overshoot of the voltage appearing across secondary windings 37 and 39. Therefore, the output signal obtained from windings 37 and 39 is a ramp function, that is, its leading edge is slightly sloped, see FIGS. 2e and 2f.

The anode of diode 27 is connected to one terminal of primary winding 21, and the other terminal of winding 21 is connected to one terminal of capacitor 17. The other terminal of capacitor 17 is connected to ground reference. Likewise, the anode of diode 29 is connected to one terminal of primary winding 23, and the other terminal of winding 23 is connected to one terminal of capacitor 19. The other terminal of capacitor 19 is connected to ground reference.

The input signals or voltages $IN_1$ and $IN_2$ are connected through resistors 12 and 14 and diodes 11 and 13 to charge capacitors 17 and 19, respectively. Resistors 12 and 14 in combination with capacitors 17 and 19, respectively, integrate the respective input signals $IN_1$ and $IN_2$.

As will be apparent hereinbelow, diodes 11 and 13 prevent capacitors 17 and 19, respectively, from discharging through the input circuitry, not shown, and assure that the capacitors discharge through windings 21 and 23. The discharge path for capacitor 17 is through winding 21, diode 27, the collector-to-emitter path of transistor 30, resistor 51 and battery 53 to ground reference; likewise, the discharge path for capacitor 19 is through winding 23, diode 29, the collector-to-emitter path of transistor 30, resistor 51 and battery 53 to ground reference.

The primary windings 21 and 23 are wound in opposition such that current flowing in one primary winding will induce a voltage of opposing polarity in the other primary winding, as conventionally indicated by the dots adjacent windings 21 and 23, i.e., if the dot indicates the positive polarity on one winding the dot will indicate a positive polarity on all the other windings. Assuming an increasing current starts to flow in one primary winding a proportionally increasing voltage of opposite polarity will be developed, that is, induced across the other primary winding.

The input signals or voltages $IN_1$ and $IN_2$ can be either positive or negative as long as they are both of the same polarity. In the embodiment of FIG. 1, diodes 11 and 13 are connected in the circuit to pass only signals of positive polarity to amplifier circuit 15. If the inputs are negative, all the diodes in the circuit would be connected reversed in polarity, a P-N-P transistor could be employed, and the polarity of the battery 53 would be changed.

The output signals or voltages from amplifier 15 are taken from a pair of secondary windings 37 and 39 of transformer 25. Windings 37 and 39 each have one terminal connected to ground and, in this embodiment, as indicated by the dots adjacent the windings, are wound to provide voltages in phase opposition; that is, if a voltage developed across winding 37 is positive, the voltage developed across winding 39 is negative and vice versa. The outputs from the amplifier 15 may be such that two negative voltages, two positive voltages or voltages of opposite polarity may be obtained, depending on the manner or direction in which windings 37 and 39 are wound. The output from winding 37 is connected from lead 45 and is labeled $E_1$ in the figures, and the output from winding 39 is connected from lead 47 and is labeled $E_2$ in the figures.

The operation of the circuit is substantially as follows. Source 34 is actuated by a wheel inductor, as noted above, at time T0 to provide a negative voltage to base 33 to render transistor 30 non-conducting, see FIG. 2a. The graphs or curves of FIG. 2 are representative only and are not to accurate scale. Actually the time T0 is in the order of milliseconds and is sufficiently long to charge capacitors 17 and 19 to a maximum level. Input signal $IN_1$ will charge capacitor 17 and input signal $IN_2$ will charge capacitor 19. Numerically, assume that $IN_1$ couples a positive 8-volt input to capacitor 17 and $IN_2$ couples a positive 4-volt input to capacitor 19. As noted, the two signals or voltages need not be simultaneous and may be displaced in time for periods depending on the value of the circuit components.

Next, biasing source 34 is actuated by a wheel inductor to provide a relatively more positive gating voltage to cause transistor 30 to be conductive, that is, current of sufficient magnitude is injected into base 33 and causes the collector 31 to emitter 32 resistance to be very low, at time T1, FIG. 2a. At the instant transistor 30 is gated on, the voltage at its collector 31 will be the maximum voltage stored in either capacitor 17 or 19, in this case 8 volts, FIG. 2b. Time interval T1 is a delay time during which capacitor 35 discharges sufficiently to allow base 33 to become positive with respect to emitter 32 and thus permit transistor 30 to conduct. As transistor 30 becomes conductive during time interval T2, primary windings 21 and 23, due to their inherent reactance characteristics, appear as high impedances. Capacitor 17 will start to discharge over a circuit which may be traced from capacitor 17 through winding 21 and the circuit previously traced. As indicated, diode 29 is poled to prevent current from capacitor 17 from flowing through primary winding 23 and affecting the charge on capacitor 19. Capacitor 19 does not discharge due to the fact since with a higher charge on capacitor 17 than on capacitor 19, diode 29 will be reversed biased and nonconductive.

As shown in FIG. 2b there is a slight "pip" at collector 31 during time interval T1. The "pip" is apparently due to the fact that, instantaneously, the positive gating voltage adds to the voltage on capacitor 35 and this appears at the collector 31. The "pip" has no effect on the output since, as noted above, transistor 30 does not conduct during time interval T1.

As transistor 30 conducts during time interval T2 the current flowing in primary winding 21 starts to become increasingly larger and the voltage developed across winding 21 starts to rise, that is, the voltage drop across winding 21 becomes increasingly larger. This causes the voltage at the junction point of winding 21 and diode 27, that is, point 44, to decrease, see FIG. 2c. Since diode 27 is conducting, the voltage at collector 31 will be approximately the same as the voltage at point 44, see FIG. 2b. The increasingly larger current flowing in winding 21 induces an increasingly higher voltage in windings 23, 37 and 39, see FIGS. 2e and 2f. It will be appreciated that the voltage developed across winding 23, see FIG. 2d, is purely inductive since at this time diode 29 is blocked or nonconducting and no current flows through winding 23. Also as noted above, the voltage induced in winding 23 by the increasing current flow in winding 21 is of opposite polarity to the voltage developed across winding 21, see FIG. 2d. At the end of time interval T2, winding 21 reaches the point where it is conducting sufficient current to cause a drop of two (2) volts to be developed thereacross and the following conditions exist:

The voltage V at point 44, that is, at the anode of diode 27 is given by the relation:

$$V44 = V17 - V21$$

where:

$V17$ = voltage appearing across capacitor 17, and
$V21$ = voltage appearing across primary winding 21.

If, as assumed above, the input voltage across capacitor 17 is 8 volts the numerical relation is:

$$V44 = 8\text{ v.} - 2\text{ v.} = 6\text{ volts}$$

As noted, transformer 25 has an iron core and due to the tight inductive coupling, curent flowing through winding 21 sufficient to produce a 2-volt drop thereacross induces or develops a 2-volt potential of relatively opposite polarity in winding 23.

The voltage at point 46, that is, at the anode of diode 29, will be given by the relation:

$$V46 = V19 + V23$$

where:

$V19$ = voltage appearing across capacitor 19, and
$V23$ = voltage appearing across primary winding 23.

If, as assumed above, the input voltage across winding 23 is 4 volts the numerical relation is:

$$V46 = 4\text{ v.} + 2\text{ v.} = 6\text{ volts}$$

Thus, at the end of time interval T2, the voltages at points 46 and 44 will be equal. The voltage at the junction of diodes 27 and 29 will be approximately the same as the voltage at points 44 and 46 since the forward drop across the diodes is relatively small. As can be seen from the above relations, as a higher voltage tends to be induced across winding 23, the voltage at point 46 tends to become more positive and diode 29 will conduct since its anode will tend to become more positive than its cathode. When diode 29 conducts, it permits current flow in winding 23 which induces a flux field in the core of transformer 25 which is in opposition to the flux field induced by winding 21 in the core of transformer 25.

During the time interval T3, the circuit will tend to balance itself, that is, both diodes 27 and 29 conduct and discharge the respective capacitors 17 and 19 through the respective primary windings 21 and 23. It has been found that if the primary windings 21 and 23 are of the same number of turns and are wound in relatively opposing directions the fluxes induced by the change of current flowing in the two primary windings balance to induce a substantially flat pulse in secondary windings 37 and 39. If secondary windings 37 and 39 are wound to have twice the number of turns as primary windings 21 and 23, the output $E_1$ will be $+4$ volts, and $E_2$ will be $-4$ volts, see FIGS. 2e and 2f. If the input voltages are reversed, that is, if $IN_2$ equals 8 volts and $IN_1$ equals 4 volts, the output voltage $E_2$ will equal 4 volts and output voltage $E_1$ will equal $-4$ volts. Thus, $E_1$ and $E_2$ will be of an absolute magnitude equal to the exact difference in the input voltages.

If, however, windings 21, 23, 37 and 39 are wound to all have an equal number of turns, the voltages induced in secondary windings 37 and 39, will not be equal, but rather will be proportional to the input voltage. For example, if $IN_1$ is 8 volts, $E_1$ would be $+2$ volts and $E_2$ would be $-2$ volts.

At the end of time interval T3, the change in current flowing in windings 21 and 23 has stopped, that is, $$\frac{di}{dt}=0$$

and the outputs $E_1$ and $E_2$ start to decrease. During time interval T4, the windings 37 and 39 in transformer 25 appear to induce a current in the primary windings resulting in output indicated by the curves of FIG. 2. In any case, the change in flux fields around windings 37 and 39 varies rather rapidly and the voltage developed thereacross decreases.

Thus, the outputs $E_1$ and $E_2$ obtained from secondary windings 37 and 39 are voltages having amplitudes proportional to the differences in amplitudes of the two input voltages $IN_1$ and $IN_2$. Note from FIGS. 2e and 2f that the maximum amplitude of the output voltages decreases slightly during time interval T3. This apparently is due to the fact that a constant rate of change in current flow through the windings of transformer 25 is not maintained. The slight decrease in voltage does not adversely affect operation of the utilization circuits since the decrease is relatively equal for the two output voltages. Also, the utilization circuit will react in the order of about 1 microsecond, and the actual difference in the output voltages will be maintained for a sufficient length of time within 2% to 3% of its true value for permitting the utilization circuits to react.

It will be appreciated that transistor 30 is nonconducting when the input voltages $IN_1$ and $IN_2$ are charging the respective capacitors 17 and 19; therefore, the transistor itself does not load down the input signals. The full accurate signal voltages are utilized to charge the capacitors and a more accurate comparison of their amplitudes can be made.

As noted above, various combinations of output voltages $E_1$ and $E_2$ may be obtained by suitably winding the windings of transformer 25 as is well known in the art. If windings 37 and 39 are wound as is shown in FIG. 1, outputs $E_1$ and $E_2$ will both be positive and if windings 37 and 39 are wound in a reverse direction to that shown in FIG. 1, $E_1$ and $E_2$ will both be negative. With windings 37 and 39 wound in a suitable direction to provide the proper polarity of voltages, diodes 55, 57, 59 and 61 or other nonlinear devices such as transistors may be connected in the circuit of FIG. 1 to assure the following outputs are provided: With diodes 55 and 59 connected in the circuit both outputs would be positive; with diodes 57 and 61 connected in the circuit both outputs would be negative; and with diodes 55 and 61 or 57 and 59 connected in the circuit one output would be positive and the other output would be negative.

Although I have herein shown and described only one form of apparatus embodying my invention, it will be understood that various changes and modifications may be made therein within the scope of the appended claims without departing from the spirit and scope of my invention.

Having thus described my invention, what I claim is:

1. A differential amplifier circuit comprising, in combination, transformer means having a pair of primary windings connected in polarity opposition and at least one secondary winding, first and second voltage storage means coupled across said pair of primary windings, means connecting first and second input voltages to said first and second storage means respectively, and means for selectively controlling each of said storage means to discharge through a respective primary winding, the one storage means having the higher amplitude voltage stored therein biasing said controlling means to permit discharge of said one storage means and to inhibit the discharge of said other storage means until the voltages in said storage means are equal, said other storage means then discharging, whereby said secondary winding develops an output voltage having an amplitude proportional to the difference in the amplitudes of said two input voltages.

2. A differential amplifier circuit comprising, in combination, a transformer having a pair of primary windings and at least one secondary winding, said primary windings being wound to have the current flowing in one primary winding induce a voltage of relatively opposing polarity in the other primary winding, first and second voltage storage means each connected in parallel with one of said primary windings, means connecting first and second input voltages to said first and second storage means respectively, means for selectively controlling each of said storage means to discharge through its associated primary winding, the storage means having the higher amplitude voltage stored therein initially discharging through its associated primary winding and biasing said control means to inhibit the discharge of said other storage means until the voltages developed across said two primary windings are equal in magnitude, and said other storage means then discharging through the other primary winding, the voltages developed across said primary windings then balancing one another, whereby said secondary winding develops an output voltage having an amplitude proportional to the difference in the amplitudes of said two input voltages.

3. A differential amplifier circuit comprising, in combination, transformer means having a pair of primary windings and a pair of secondary windings, first and second storage means connected in series and connected across said pair of primary windings, means connecting first and second input voltages to said first and second storage means respectively, an electronic device controlling each of said storage means to discharge through a respective primary winding, the one storage means having the higher amplitude voltage stored therein biasing said device to permit discharge of said one storage means and to inhibit the discharge of said other storage means until the voltages in said storage means are equal, a nonlinear device connected to said secondary winding to control the polarity of the output voltages.

4. A differential amplifier circuit comprising, in combination, transformer means having a pair of primary windings and a pair of secondary windings, first and second storage means connected in series and connected across said pair of primary windings, means connecting first and second input voltages to said first and second storage means respectively, an electronic device controlling each of said storage means to discharge through a respective primary winding, the one storage means having the higher amplitude voltage stored therein biasing said device to permit discharge of said one storage means and to inhibit the discharge of said other storage means until the voltages in said storage means are equal, said secondary windings being selectively wound to provide output voltages either of similar or opposite polarity.

5. A differential amplifier circuit for comparing the amplitudes of two voltages which may not attain their maximum amplitude concurrently comprising, in combination, a transformer having a pair of primary windings and at least one secondary winding, said primary windings being wound to have the current flowing in one primary winding induce a voltage of relatively opposing polarity in the other primary winding, first and second storage capacitors each connected in parallel with one of said primary windings, means connecting first and second input voltage pulses to said first and second capacitors respectively, means for selectively controlling each said capacitor to discharge through its associated primary winding, the capacitor having the higher amplitude voltage stored therein causing an increasingly larger current to flow through its associated primary winding and biasing said control means to inhibit the discharge of said other storage means until the voltages developed across said two primary windings are approximately equal in magnitude, and said other capacitor then discharging through the other primary winding, the voltages developed across said primary windings then balancing one another, whereby said secondary winding develops an output pulse having an amplitude proportional to the difference in the amplitudes of said two input voltages.

6. A differential amplifier circuit comprising, in combination, a transformer having a pair of primary windings and at least one secondary winding, said primary windings being wound to have the current flowing in one primary winding induce a voltage of relatively opposing polarity in the other primary winding; a pair of unidirectional control devices connected to one another in polarity opposition; said primary windings being connected to respective ones of said devices; first and second storage means each connected in parallel with one of said primary windings; means connecting first and second input voltage pulses to said first and second storage means respectively; switch means having open and closed conditions connected to the junction of said control devices; said switch means when in a closed condition providing a discharge path for said storage means; the storage means having the higher amplitude voltage stored therein initially discharging to cause an increasingly larger current to flow through its associated primary winding, its associated device and said switch; the induced voltage developed across the other primary winding biasing said other device to conduct when the voltages developed across said two primary windings are equal for permitting the other of said storage means to discharge through said other primary winding, said other device and said switch means; the voltages developed across said primary winding then balancing each other; whereby said secondary winding develops an output pulse having amplitudes proportional to the difference in the amplitudes of said two input voltages.

7. A differential amplifier circuit comprising, in combination, a transformer having a pair of primary windings and a pair of secondary windings, said primary windings being wound to have current flowing in one primary winding induce a voltage of relatively opposing polarity in the other primary winding; a first and second diode having a common one of their electrodes connected to one another; the first of said primary windings being connected in series with said first diode and the second of said primary windings being connected in series with said second diode; a first capacitor connected in parallel with said first primary winding and said first diode; a second capacitor connected in parallel with said second primary winding and said second diode; means connecting a first input voltage to said first capacitor for storing said first voltage therein; means connecting a second input voltage to said second capacitor for storing said second voltage therein; switch means energizable for connecting to the junction of said diodes for providing a discharge path for said capacitors; the capacitor having voltage which has a higher amplitude stored therein forward biasing the associated diode to cause an increasingly larger current to flow through the associated primary winding, the associated diode and said switch means until the voltage drops across said two primary windings are equal and of opposite polarity at which time both diodes are forward biased for permitting both capacitors to discharge concurrently through their associated primary windings; the voltages induced in said primary windings then balancing each other; whereby said secondary windings provide output pulses having amplitudes proportional to the difference in the amplitudes of said input voltages.

8. A differential amplifier circuit comprising, in combination, a transistor having base, emitter and collector electrodes; a transformer having a first and second primary winding and at least one secondary winding, said primary windings being wound to have the current flowing in one primary winding induce a voltage of relatively opposing polarity in the other primary winding; first and second diodes connected to one another in polarity opposition, said first primary winding being connected in series with first diode and said second primary winding being connected in series with said second diode; a first capacitor having one terminal connected to said first primary winding; a first resistor; means for connecting a first input voltage through said first resistor to said first capacitor for integrating said voltage and storing said voltage in said first capacitor; a second capacitor having one terminal connected to said second primary winding; a second resistor; means for connecting a second input voltage through said first resistor to said second capacitor for integrating said voltage and storing said second voltage in said second capacitor; the voltage stored in said first and second capacitors controlling the conducting condition of said first and second diodes; biasing means for controlling said transistor to be nonconducting when the voltage is being stored in said capacitors whereby said transistor does not load down said input voltage, said biasing means controlling said transistor to conduct for providing a discharge path for said capacitors; the capacitor having the higher amplitude voltage stored therein causing an increasingly larger current to flow through the associated primary winding, the associated diode and said transistor until the voltage drop across the one primary winding is equal to the voltage induced in the other primary winding; both diodes then being rendered conductive to discharge their respective capacitors; whereby said secondary winding develops an output having an amplitude proportional to the difference in the amplitudes of said two input voltages.

9. A differential amplifier circuit comprising, in combination, an N-P-N transistor having base, emitter and collector electrodes; a biasing source for controlling the conducting condition of said transistor; a transformer having a pair of primary windings and a pair of secondary windings; said primary windings being wound to have the current flowing in one primary winding induce a voltage of relatively opposing polarity in the other primary winding; first and second diodes having their cathodes connected to one another; the collector of said transistor being connected to the junction of said diodes; one terminal of the first of said primary windings being connected to the anode of said first diode and one terminal of the second of said primary windings being connected to the anode of said second diode; a pair of capacitors, each capacitor connected in parallel to one of said primary windings; one of said diodes, and said transistor; means connecting a first positive input voltage pulse to said first capacitor for storing said voltage therein; means connecting a second positive input voltage to said second capacitor for storing said second voltage therein; a biasing source for controlling the conducting condition of said transistor; the capacitor having the higher amplitude voltage stored therein causing the associated diode to be forward biased to permit an increasingly larger current to flow through the associated primary winding, said associated diode, and said transistor until the voltage drop across said associated primary winding due to current flow therethrough is equal in magnitude to the voltage induced in the other primary winding; the other of said diodes then being forward biased to permit its associated capacitor to discharge through its associated primary windings; the voltages developed across said two primary windings then balancing one another whereby said secondary windings provide output pulses having amplitudes proportional to the difference in magnitudes of the input pulses; and unidirectional current control devices connected to said secondary windings for controlling the polarity of the output pulses.

References Cited in the file of this patent
UNITED STATES PATENTS
2,603,689   Stevens et al. _____ July 15, 1952